(12) United States Patent  
Hozono

(10) Patent No.: US 8,625,172 B2  
(45) Date of Patent: Jan. 7, 2014

(54) IMAGE READING DEVICE AND IMAGE FORMING APPARATUS

(75) Inventor: Tomohide Hozono, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 56 days.

(21) Appl. No.: 13/433,145

(22) Filed: Mar. 28, 2012

(65) Prior Publication Data

US 2012/0250111 A1 Oct. 4, 2012

(30) Foreign Application Priority Data

Mar. 31, 2011 (JP) ................................. 2011-078391

(51) Int. Cl.
*H04N 1/04* (2006.01)
*H04N 1/46* (2006.01)

(52) U.S. Cl.
USPC ............................ 358/475; 358/505; 358/509

(58) Field of Classification Search
None
See application file for complete search history.

(56) References Cited

FOREIGN PATENT DOCUMENTS

| JP | 2008-147848 | 6/2008 |
|---|---|---|
| JP | 2009-75184 | 4/2009 |
| JP | 2010-107757 | 5/2010 |
| JP | 2010-283436 | 12/2010 |
| JP | 2012-165151 | 8/2012 |

*Primary Examiner* — Thierry L Pham
(74) *Attorney, Agent, or Firm* — Knobbe Martens Olson & Bear LLP

(57) ABSTRACT

An image reading device has a light emitting unit. The light emitting unit has a light emitting portion, a light guiding member, a holding member and a case member. The light guiding member is disposed along a main scanning direction, and an end portion of the light guiding member faces the light emitting portion. The light guiding member has a light irradiating portion which emits light to an outside. The holding member holds the light emitting portion and the light guiding member. In addition, the holding member has a first holding portion that directly or indirectly positions and holds the light emitting portion, and a second holding portion that positions and holds one end or both ends of the light guiding member. The case member houses the holding member that is in a state of being positioned.

15 Claims, 11 Drawing Sheets

IMAGE READING DEVICE AND IMAGE FORMING APPARATUS

This application is based on and claims the benefit of priority from Japanese Patent Application No. 2011-078391, filed on 31 Mar. 2011, the content of which is incorporated herein by reference.

BACKGROUND

The present disclosure relates to an image reading device and an image forming apparatus.

In recent years, with the background of environmental issues, there is an image reading device that employs an LED as a light source.

As such an image reading device that employs an LED, for example, there is an image reading device that is configured to dispose a plurality of LEDs in a main scanning direction at a predetermined interval.

However, the image reading device that requires a plurality of LEDs has been disadvantageous in terms of cost performance in some cases.

In contrast, as another image reading device that employs an LED as a light source, there is an image reading device that disposes a high-intensity LED on one end side in a main scanning direction, in which a long stick-like light guiding member composed of acryl or polycarbonate is disposed to extend in the main scanning direction.

In such a case, only a single (or a small number of) LED(s) is required, which brings about advantage in terms of cost performance.

However, in order to uniformly irradiate an original with light in the image reading device, the stick-like light guiding member needs to be positioned with high accuracy, by taking into consideration a positional relationship thereof with a reflecting member that is a related member.

SUMMARY

The image reading device according to the present disclosure has a light emitting unit.

The light emitting unit has a light emitting portion, a light guiding member, a holding member and a case member.

The light emitting portion emits light.

The light guiding member is a stick-like light guiding member that is disposed along a main scanning direction, and an end portion of the light guiding member faces the light emitting portion. In addition, the light guiding member has a light irradiating portion, which is formed in a part of an outer periphery thereof along the main scanning direction, and which emits light to an outside.

The holding member holds the light emitting portion and the light guiding member. In addition, the holding member has a light reflecting portion that is disposed to face an outer periphery that is opposite to the light irradiating portion side of the light guiding member, a first holding portion that directly or indirectly positions and holds the light emitting portion, and a second holding portion that positions and holds one end or both ends of the light guiding member.

The case member houses the holding member that is in a state of being positioned.

The image forming apparatus according to the present disclosure includes the image reading device.

The image reading device has a light emitting portion, a light guiding member, a holding member and a case member.

The light emitting portion emits light.

The light guiding member is a stick-like light guiding member that is disposed along a main scanning direction, and an end portion of the light guiding member faces the light emitting portion. The light guiding member has a light irradiating portion, which is formed in a part of an outer periphery thereof along the main scanning direction, and which emits light to an outside.

The holding member holds the light emitting portion and the light guiding member. In addition, the holding member has a light reflecting portion that is disposed to face an outer periphery that is opposite to the light irradiating portion side of the light guiding member, a first holding portion that directly or indirectly positions and holds the light emitting portion, and a second holding portion that positions and holds one end or both ends of the light guiding member.

The case member houses the holding member that is in a state of being positioned.

A light emitting unit for an image reading device according to the present disclosure has a light emitting portion, a light guiding member, a holding member and a case member.

The light emitting portion emits light.

The light guiding member is a stick-like light guiding member that is disposed along a main scanning direction, and an end portion of the light guiding member faces the light emitting portion. In addition, the light guiding member has a light irradiating portion, which is formed in a part of an outer periphery thereof along the main scanning direction, and which emits light to an outside.

The holding member holds the light emitting portion and the light guiding member. In addition, the holding member has a light reflecting portion that is disposed to face an outer periphery that is opposite to the light irradiating portion side of the light guiding member, a first holding portion that directly or indirectly positions and holds the light emitting portion, and a second holding portion that positions and holds one end or both ends of the light guiding member.

The case member houses the holding member that is in a state of being positioned.

DETAILED DESCRIPTION

Descriptions are hereinafter provided for an embodiment of an image forming apparatus according to the present disclosure with reference to the drawings.

Figure 1:
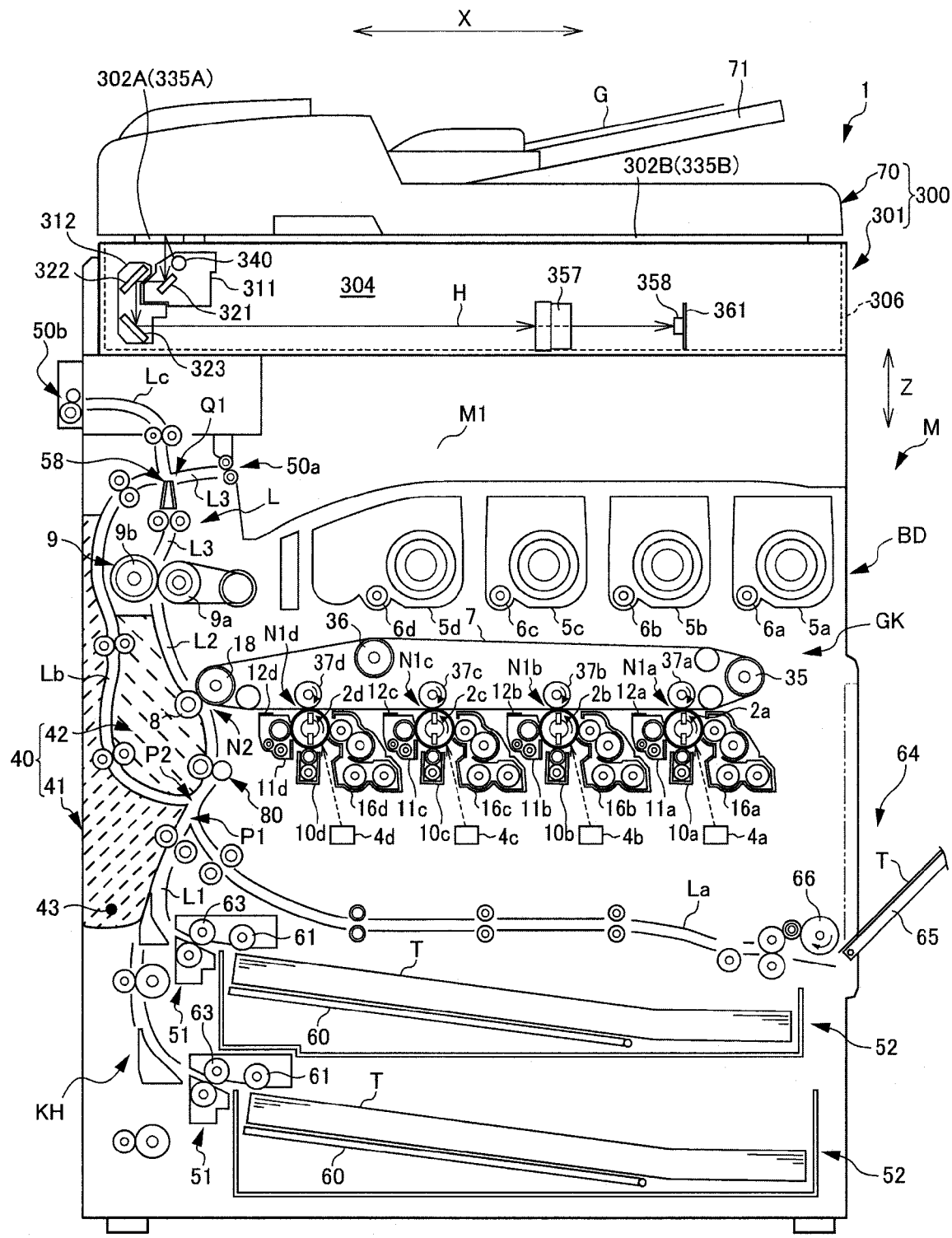
FIG. 1 is a diagram for illustrating arrangement of components of a copy machine 1 as an image forming apparatus.

An overall configuration of a copy machine 1 as the image forming apparatus of the present embodiment will be described with reference to FIG. 1. FIG. 1 is a diagram for illustrating arrangement of components of the copy machine 1 as the image forming apparatus.

As shown in FIG. 1, the copy machine 1 as the image forming apparatus includes: an image reading device 300 that is disposed at an upper side in a perpendicular direction Z of the copy machine 1; and an apparatus main body M, which is disposed at a lower side in the perpendicular direction Z of the copy machine 1, and which forms a toner image on a sheet of paper T as a sheet-like target material, based on image information that is read from the image reading device 300.

It should be noted that, in the following descriptions of the copy machine 1, a sub scanning direction X is also referred to as a "lateral direction" of the copy machine 1, and a main scanning direction Y (a direction penetrating into FIG. 1; see FIG. 2) is also referred to as a "depth direction" of the copy machine 1. The perpendicular direction Z of the copy machine 1 is orthogonal to the sub scanning direction X and the main scanning direction Y.

Firstly, descriptions are provided for the image reading device 300.

As shown in FIG. 1, the image reading device 300 includes: a reader unit 301 that reads an image of an original G; and an original feed unit 70 that is disposed on an upper side of the reader unit 301 and feeds the original G to the reader unit 301.

The reader unit 301 includes: a housing 306; and a first reader surface 302A and a second reader surface 302B that are disposed on an upper side of the housing 306. Moreover, the reader unit 301 includes, in an internal space 304 of the housing 306: a light guiding member 340 that irradiates the original G mounted on the first reader surface 302A or the second reader surface 302B with light received from a light emitting portion that serves as a light source; a plurality of mirrors 321, 322 and 323; a first frame body 311 and a second frame body 312 that are case members and move in the sub scanning direction X; an imaging lens 357; a CCD 358 that serves as reading means; and a CCD substrate 361 that performs predetermined processing on image information that is read by the CCD 358, and outputs the image information to the apparatus main body M. The light guiding member 340 and the mirror 321 are housed in the first frame body 311. The second mirror 322 and the third mirror 323 are housed in the second frame body 312.

The light guiding member 340 and a light emitting portion as the light source are assembled into the first frame body 311 as the case member, and are unitized as a light emitting unit 400 (see FIG. 2) to be attached to the housing 306.

The light emitting unit 400 will be described later in detail.

The original feed unit 70 is connected with the reader unit 301 by way of a connecting portion (not illustrated) so as to be openable and closable. The original feed unit 70 includes: an original mounting portion 71 on an upper side thereof; and feed rollers (not illustrated) in an inside thereof. The original feed unit 70 has a function of protecting the first reader surface 302A and the second reader surface 302B of the reader unit 301.

The first reader surface 302A is a reader surface that is used when reading the original G that is fed by the original feed unit 70. The first reader surface 302A is formed along an upper surface of a first contact glass 335A to which the original G is fed. The first reader surface 302A is positioned in the vicinity of a left lateral face of the housing 306. It should be noted that such a position shown in FIG. 1 is also referred to as a "first reading position".

The second reader surface 302B is a reader surface that is used when reading the original G without using feed by the original feed unit 70. The second reader surface 302B is formed along an upper surface of a second contact glass 335B on which the original G is mounted. The second reader surface 302B is disposed more to the right than the first reader surface 302B, and spans large portions of the reader unit 301 in the sub scanning direction X.

The first reader surface 302A and the second reader surface 302B extend in a direction orthogonal to the sub scanning direction X and the main scanning direction Y.

The original G that is fed by the original feed unit 70 is mounted on the original mounting portion 71 for reading. The original G that is mounted on the original mounting portion 71 is fed to the first reader surface 302A of the reader unit 301 by the feed rollers provided inside the original feed unit 70. In this case, the first frame body 311 and the second frame body 312 do not move but remain in the first reading position. In addition, as the original feed unit 70 slidingly feeds the original G on the first reader surface 302A, the CCD 358 reads an image that has been formed on a surface of the original G.

When the original feed unit 70 is in an opened state, the original G is mounted on the second reader surface 302B. In this case, the first frame body 311 and the second frame body 312 each move in the sub scanning direction X, while maintaining a length of a light path H (to be described later) constant. As a result, an image of the original G that is mounted on the second reader surface 302B is read.

In the internal space 304 of the housing 306, the plurality of mirrors 321, 322 and 323 form the light path H through which the light from the original G is incident upon the imaging lens 357. Furthermore, the first frame body 311 moves in the sub scanning direction X at a predetermined speed A, and the second frame body 312 moves in the sub scanning direction X at a predetermined speed A/2; consequently, the length of the light path H is maintained constant even while reading an image.

Next, descriptions are provided for the apparatus main body M.

The apparatus main body M includes: an image forming unit GK that forms a predetermined toner image on the sheet of paper T based on predetermined image information; and a paper feeding/ejection portion KH that feeds the sheet of paper T to the image forming unit GK, and ejects the sheet of paper T on which a toner image has been formed.

An external shape of the apparatus main body M is composed of a case body BD as a housing.

As shown in FIG. 1, the image forming unit GK includes: photoreceptor drums 2a, 2b, 2c and 2d as image supporting bodies (photoreceptors); charging portions 10a, 10b, 10c and 10d; laser scanner units 4a, 4b, 4c and 4d as exposure units; developing units 16a, 16b, 16c and 16d; toner cartridges 5a, 5b, 5c and 5d; toner feeding portions 6a, 6b, 6c and 6d; drum cleaning portions 11a, 11b, 11c and 11d; static eliminators 12a, 12b, 12c and 12d; an intermediate transfer belt 7; primary transfer rollers 37a, 37b, 37c and 37d; a secondary transfer roller 8; an opposing roller 18; and the fusing unit 9.

As shown in FIG. 1, the paper feeding/ejection portion KH includes a paper feeding cassette 52, a manual feeding portion 64, a paper path L for the paper T, a resist roller pair 80, a first ejection portion 50a, and a second ejection portion 50b.

It should be noted that the paper path L is an assembly of a first paper path L1, a second paper path L2, a third paper path L3, a manual paper path La, a reverse paper path Lb, and a post-processing paper path Lc.

Components of the image forming unit GK and the paper feeding/ejection portion KH are described hereinafter in detail.

Firstly, descriptions are provided for the image forming unit GK.

In the image forming unit GK, charging by the charging portions 10a, 10b, 10c and 10d; exposure by the laser scanner units 4a, 4b, 4c and 4d; development by the developing units 16a, 16b, 16c and 16d; primary transfer by the intermediate transfer belt 7 and the primary transfer rollers 37a, 37b, 37c and 37d; static elimination by the static eliminators 12a, 12b, 12c and 12d; and cleaning by the drum cleaning portions 11a, 11b, 11c and 11d are sequentially performed on a surface of the photoreceptor drums 2a, 2b, 2c and 2d from an upstream side to a downstream side.

In addition, in the image forming unit GK, secondary transfer is performed by the intermediate transfer belt 7, the secondary transfer roller 8 and the opposing roller 18, and fixation is performed by the fusing unit 9.

Each of the photoreceptor drums 2a, 2b, 2c and 2d is composed of a cylindrically shaped member, and functions as a photoreceptor or an image supporting body. Each of the photoreceptor drums 2a, 2b, 2c and 2d is disposed to be rotatable in a direction of an arrow, about a rotational axis that extends in a direction orthogonal to a direction of movement of the intermediate transfer belt 7. An electrostatic latent image can be formed on a surface of each of the photoreceptor drums 2a, 2b, 2c and 2d.

The charging portions 10a, 10b, 10c and 10d are disposed to face the surfaces of the photoreceptor drums 2a, 2b, 2c and 2d, respectively. The charging portions 10a, 10b, 10c and 10d uniformly negatively charge (negative polarity) or positively charge (positive polarity) the surfaces of the photoreceptor drums 2a, 2b, 2c and 2d, respectively.

The laser scanner units 4a, 4b, 4c and 4d that function as exposure units are disposed to be spaced apart from the surfaces of the photoreceptor drums 2a, 2b, 2c and 2d, respectively. Each of the laser scanner units 4a, 4b, 4c and 4d is configured to include a laser light source, a polygonal mirror, a polygonal mirror driving motor and the like, which are not illustrated.

The laser scanner units 4a, 4b, 4c and 4d scan and expose the surfaces of the photoreceptor drums 2a, 2b, 2c and 2d, respectively, based on the image information related to the image that is read by the reader unit 301. Scanning and exposing by the laser scanner units 4a, 4b, 4c and 4d remove electric charges of parts thus exposed on the surfaces of the photoreceptor drums 2a, 2b, 2c and 2d, respectively. In this way, an electrostatic latent image is formed on the surface of each of the photoreceptor drums 2a, 2b, 2c and 2d.

The developing units 16a, 16b, 16c and 16d are disposed correspondingly to the photoreceptor drums 2a, 2b, 2c and 2d so as to face the corresponding surfaces of the photoreceptor drums 2a, 2b, 2c and 2d, respectively. The developing units 16a, 16b, 16c and 16d depose color toners on the electrostatic latent images formed on the surfaces of the photoreceptor drums 2a, 2b, 2c and 2d, and form color toner images on the surfaces of the photoreceptor drums 2a, 2b, 2c and 2d, respectively. The developing units 16a, 16b, 16c and 16d correspond to four colors of yellow, cyan, magenta and black, respectively. The developing units 16a, 16b, 16c and 16d are each configured to include a developing roller disposed to face the surfaces of the photoreceptor drums 2a, 2b, 2c and 2d, a stirring roller for stirring toner, and the like.

The toner cartridges 5a, 5b, 5c and 5d are provided correspondingly to the developing units 16a, 16b, 16c and 16d, respectively, and store the toners of different colors to be supplied to the developing units 16a, 16b, 16c and 16d, respectively. The toner cartridges 5a, 5b, 5c and 5d store toners of yellow, cyan, magenta and black, respectively.

The toner feeding portions 6a, 6b, 6c and 6d are provided correspondingly to the toner cartridges 5a, 5b, 5c and 5d and the developing units 16a, 16b, 16c and 16d, respectively; and the toner feeding portions 6a, 6b, 6c and 6d supply the color toners stored in the toner cartridges 5a, 5b, 5c and 5d to the developing units 16a, 16b, 16c and 16d, respectively. The toner feeding portions 6a, 6b, 6c and 6d are connected to the developing units 16a, 16b, 16c and 16d, respectively, via toner feeding paths (not illustrated).

Toner images of respective colors formed on the photoreceptor drums 2a, 2b, 2c and 2d are sequentially primarily transferred onto the intermediate transfer belt 7. The intermediate transfer belt 7 is stretched around a driven roller 35, the opposing roller 18 composed of a driving roller, a tension roller 36, and the like. Since the tension roller 36 biases the intermediate transfer belt 7 from inside to outside, a predetermined tension is applied to the intermediate transfer belt 7.

The primary transfer rollers 37a, 37b, 37c and 37d are disposed on the opposite sides of the photoreceptor drums 2a, 2b, 2c and 2d, respectively, so as to sandwich the intermediate transfer belt 7.

Predetermined parts of the intermediate transfer belt 7 are nipped between the primary transfer rollers 37a, 37b, 37c and 37d and the photoreceptor drums 2a, 2b, 2c and 2d, respectively. The predetermined nipped parts are pressed against the surfaces of the photoreceptor drums 2a, 2b, 2c and 2d. Primary transfer nips N1a, N1b, N1c and N1d are formed between the photoreceptor drums 2a, 2b, 2c and 2d and the primary transfer rollers 37a, 37b, 37c and 37d, respectively. At the primary transfer nips N1a, N1b, N1c and N1d, respectively, toner images of the respective colors developed on the photoreceptor drums 2a, 2b, 2c and 2d are sequentially primarily transferred onto the intermediate transfer belt 7. In this manner, a full-color toner image is formed on the intermediate transfer belt 7.

Primary transfer bias application portions (not illustrated) apply a primary transfer bias to the primary transfer rollers 37a, 37b, 37c and 37d, for the purpose of transferring the toner images of the colors formed on the photoreceptor drums 2a, 2b, 2c and 2d onto the intermediate transfer belt 7.

The static eliminators 12a, 12b, 12c and 12d are disposed to face the surfaces of the photoreceptor drums 2a, 2b, 2c and 2d, respectively. The static eliminators 12a, 12b, 12c and 12d remove electricity (eliminate an electrical charge) from the surfaces of the photoreceptor drums 2a, 2b, 2c and 2d, on which the primary transfer has been performed, by irradiating the surfaces of the photoreceptor drums 2a, 2b, 2c and 2d, respectively, with light.

The drum cleaning portions 11a, 11b, 11c and lid are disposed to face the surfaces of the photoreceptor drums 2a, 2b, 2c and 2d, respectively. The drum cleaning portions 11a, 11b, 11c and 11d remove toner and attached matter remaining on the surfaces of the photoreceptor drums 2a, 2b, 2c and 2d, respectively, and feed the removed toner to a predetermined collection mechanism for collection.

The secondary transfer roller 8 secondarily transfers the full-color toner image, which has been primarily transferred to the intermediate transfer belt 7, to the sheet of paper T. Secondary transfer bias application portions (not illustrated) apply a secondary bias to the secondary transfer roller 8 for the purpose of transferring the full-color toner image formed on the intermediate transfer belt 7 to the sheet of paper T.

The secondary transfer roller 8 selectively abuts and is separated from the intermediate transfer belt 7. More specifically, the secondary transfer roller 8 is configured to be movable between an abutting position of abutting the intermediate transfer belt 7, and a separated position of being separated from the intermediate transfer belt 7. In particular, the secondary transfer roller 8 is disposed in the abutting position when secondarily transferring the toner image, which has been primarily transferred to the surface of the intermediate transfer belt 7, to the sheet of paper T, and is otherwise disposed in the separated position.

The opposing roller 18 is disposed on the opposite side of the secondary transfer roller 8 so as to sandwich the intermediate transfer belt 7. A predetermined part of the intermediate transfer belt 7 is sandwiched between the secondary transfer roller 8 and the opposing roller 18. The sheet of paper T is pressed against an outer surface of the intermediate transfer belt 7 (the surface onto which the toner image has been primarily transferred). A secondary transfer nip N2 is formed between the intermediate transfer belt 7 and the secondary transfer roller 8. At the secondary transfer nip N2, the full-color toner image, which has been primarily transferred to the intermediate transfer belt 7, is secondarily transferred to the sheet of paper T.

The fusing unit 9 fuses and pressurizes color toners composing the toner image, which has been secondarily transferred to the sheet of paper T, and fixes the color toners on the sheet of paper T. The fusing unit 9 includes a heating rotator 9a that is heated by a heater, and a pressurizing rotator 9b that is brought into pressurized contact with the heating rotator 9a. The heating rotator 9a and the pressurizing rotator 9b nip and compress, and feed the sheet of paper T, to which the toner image has been secondarily transferred. Since the sheet of paper T is fed while being nipped between the heating rotator 9a and the pressurizing rotator 9b, the toner transferred to the sheet of paper is fused and pressurized to be fixed on the sheet of paper T.

Next, descriptions are provided for the paper feeding/ejection portion KH.

As shown in FIG. 1, two paper feeding cassettes 52 that store the sheets of paper T are disposed in vertical arrangement in a lower portion of the apparatus main body M. The paper feeding cassettes 52 are configured to be withdrawable from the housing of the apparatus main body M in a horizontal direction. A paper tray 60 for placing the sheets of paper T is disposed in both the paper feeding cassettes 52. The paper feeding cassette 52 stores the sheets of paper T as being stacked on the paper tray 60. A sheet of paper T placed on the paper tray 60 is fed to the paper path L by a cassette feeding portion 51 that is disposed at the end on a paper feeding side (a left end of FIG. 1) of the paper feeding cassettes 52. The cassette feeding portion 51 includes a double feed preventing mechanism that is composed of: a forward feed roller 61 for picking up the sheet of paper T from the paper tray 60; and a feed roller pair 63 for feeding the sheet of paper T one at a time to the paper path L.

The manual feeding portion 64 is provided on a right lateral face (the right side in FIG. 1) of the apparatus main body M. The manual feeding portion 64 is primarily provided for the purpose of feeding a sheet of paper T, which is different in size and type from the sheets of paper T stored in the paper feeding cassette 52, to the apparatus main body M.

The manual feeding portion 64 includes a manual feeding tray 65 and a paper feeding roller 66, in which the manual feeding tray 65 in its closed state composes a part of the right lateral face of the apparatus main body M. A lower end of the manual feeding tray 65 is pivotally connected (so as to be openable and closable) to the apparatus main body M in the vicinity of the paper feeding roller 66. A sheet or sheets of paper T are placed on the manual feeding tray 65 in the opened state. The paper feeding roller 66 feeds the sheet of paper T, which is placed on the manual feeding tray 65 in the opened state, to the manual paper path La.

The first ejection portion 50a and the second ejection portion 50b are provided on an upper side of the apparatus main body M. The first ejection portion 50a and the second ejection portion 50b eject the sheet of paper T to the outside of the apparatus main body M. The first ejection portion 50a and the second ejection portion 50b will be described later in detail.

The paper feed path L includes: the first paper path L1 from the cassette feeding portion 51 to the secondary transfer nip N2; the second paper path L2 from the secondary transfer nip N2 to the fusing unit 9; the third paper path L3 from the fusing unit 9 to the first ejection portion 50a; the manual paper path La that guides the sheet of paper fed from the manual feeding portion 64 to the first paper path L1; the reverse paper path Lb that reverses and returns the sheet of paper, which is fed from an upstream side to a downstream side in the third paper path L3, to the first paper path L1; and a post-processing paper path Lc that feeds the sheet of paper, which is fed from the upstream side to the downstream side in the third paper path L3, to a post-processing device (not illustrated) that is connected to the second ejection portion 50b.

In addition, a first junction P1 and a second junction P2 are provided somewhere along the first paper path L1. A first branch portion Q1 is provided somewhere along the third paper path L3.

The first junction P1 is a junction where the manual paper path La joins the first paper path L1. The second junction P2 is a junction where the reverse paper path Lb joins the first paper path L1.

The first branch portion Q1 is a branch portion where the post-processing paper path Lc branches off the third paper path L3. A switching member 58 is provided in the first branch portion Q1. The switching member 58 shifts (switches) a feeding direction of the sheet of paper T ejected from the fusing unit 9 to the third paper path L3 leading to the first ejection portion 50a, or to the post-processing paper path Lc leading to the second ejection portion 50b.

In addition, a sensor for detecting the sheet of paper T and a resist roller pair 80 are disposed somewhere along the first paper path L1 (more specifically, between the second junction P2 and the secondary transfer roller 8), in which the purpose of the resist roller pair 80 is skew compensation of the sheet of paper T, and timing adjustment between the forming of the toner image in the image forming unit GK and the feeding of the sheet of paper T. The sensor is disposed immediately anterior to the resist rollers pair 80 in the feeding direction of the sheet of paper T (on the upstream side in the feeding direction). The resist roller pair 80 is a pair of rollers that feed the sheet of paper T by performing the correction or the timing adjustment based on detection signal information from the sensor.

The reverse paper path Lb is a paper path that is provided for reversing the sheet of paper T such that an unprinted surface, which is opposite to a printed surface, faces the intermediate transfer belt 7, when performing duplex printing of the sheet of paper T. The reverse paper path Lb can reverse the sheet of paper T, which has been fed from the first branch portion Q1 toward the ejection portion 50 side, return the sheet of paper T to the first paper path L1, and fed the sheet of paper T to an upstream side of the resist roller pair 80 disposed on an upstream side of the secondary transfer roller 8. In the secondary transfer nip N2, a predetermined toner image is transferred to the unprinted surface of the sheet of paper T that has been reversed by the reverse paper path Lb.

The first ejection portion 50a is formed at an end of the third paper path L3. The first ejection portion 50a is disposed on an upper side of the apparatus main body M. The first ejection portion 50a is open toward the right lateral face side of the apparatus main body M (the right side or the manual feeding portion 64 side in FIG. 1). The first ejection portion 50a ejects the sheet of paper T, which is fed through the third paper path L3, to the outside of the apparatus main body M.

An ejected paper accumulating portion M1 is formed on an opening side of the first ejection portion 50a. The ejected paper accumulating portion M1 is formed on an upper face (external face) of the apparatus main body M. The ejected paper accumulating portion M1 is a portion that is formed by downwardly recessing the upper face of the apparatus main body M. A bottom face of the ejected paper accumulating portion M1 composes a part of the upper face of the apparatus main body M. After predetermined toner images are formed on the sheets of paper T, the sheets of paper T are ejected from the first ejection portion 50a, and are stacked and accumulated in the ejected paper accumulating portion M1.

The second ejection portion 50b is formed at an end of the post-processing paper path Lc. The second ejection portion 50b is disposed on an upper side of the apparatus main body M. The second ejection portion 50b is open toward a left lateral face side of the apparatus main body M (the left side in FIG. 1; a side where a post-processing device is connected to). The second ejection portion 50b ejects the sheet of paper T, which is fed through the post-processing paper path Lc, to the outside the apparatus main body M.

A post-processing device (not illustrated) is connected at an opening side of the second ejection portion 50b. The post-processing device performs post-processing (stapling, punching, etc.) on a sheet of paper ejected from the image forming apparatus (copy machine 1).

It should be noted that a sensor for detecting a sheet of paper is disposed at a predetermined position in each paper path.

Next, brief descriptions are provided for a structure for eliminating paper jams in the main paper paths L1 to L3 (the first paper path L1, the second paper path L2 and the third paper path L3 are also collectively referred to as the "main paper paths" hereinafter) and in the reverse paper path Lb.

As shown in FIG. 1, the main paper paths L1 to L3 and the reverse paper path Lb are aligned so as to extend primarily in the vertical direction on the left lateral face side of the apparatus main body M (the left side in FIG. 1). A cover body 40 is provided to the left lateral face side of the apparatus main body M (the left side in FIG. 1) such that the cover body 40 forms a part of the lateral face of the apparatus main body M. The cover body 40 is connected at a lower end thereof to the apparatus main body M via a fulcrum shaft 43. The fulcrum shaft 43 is disposed such that an axial direction of the fulcrum shaft 43 intersects the main paper paths L1 to L3 and the reverse paper path Lb. The cover body 40 is configured to be pivotable between a closed position (position shown in FIG. 1) and an opened position (not illustrated) about the fulcrum shaft 43.

The cover body 40 is configured to include: a first cover portion 41 pivotably connected to the apparatus main body M via the fulcrum shaft 43; and a second cover portion 42 pivotably connected to the apparatus main body M via the same fulcrum shaft 43. The first cover portion 41 is positioned more towards the outside (the lateral face side) of the apparatus main body M than the second cover portion 42. It should be noted that, in FIG. 1, the portion hatched by falling diagonal broken lines from top right to bottom left is the first cover portion 41, and the portion hatched by falling diagonal broken lines from top left to bottom right is the second cover portion 42.

In a state where the cover body 40 is in the closed position, the outer face side of the first cover portion 41 forms a part of the outer face (the lateral face) of the apparatus main body M.

In addition, in a state where the cover body 40 is in the closed position, the inner face side (the apparatus main body M side) of the second cover portion 42 forms a part of the main paper paths L1 to L3.

Furthermore, in a state where the cover body 40 is in the closed position, the inner face side of the first cover portion 41 and the outer face side of the second cover portion 42 compose at least a part of the reverse paper path Lb. In other words, the reverse paper path Lb is formed between the first cover portion 41 and the second cover portion 42.

Since the copy machine 1 according to the present embodiment is provided with the cover body 40 thus configured, in a case in which a paper jam occurs in the main paper paths L1 to L3, the cover body 40 pivots from the closed position shown in FIG. 1 to the opened position (not illustrated), and a jammed sheet of paper in the main paper paths L1 to L3 can be removed by opening the main paper paths L1 to L3. On the other hand, in a case in which a paper jam occurs in the reverse paper path Lb, the reverse paper path Lb opens by pivoting the cover body 40 to the opened position, thereafter the second cover portion 42 pivots about the fulcrum shaft 43 toward the apparatus main body M side (the right side in FIG. 1) to release the reverse paper path Lb, and a jammed sheet of paper in the reverse paper path Lb can be removed.

Next, with reference to FIGS. 2 to 11, descriptions are provided for a light emitting unit 400 that composes the image reading device 300.

Figure 2:
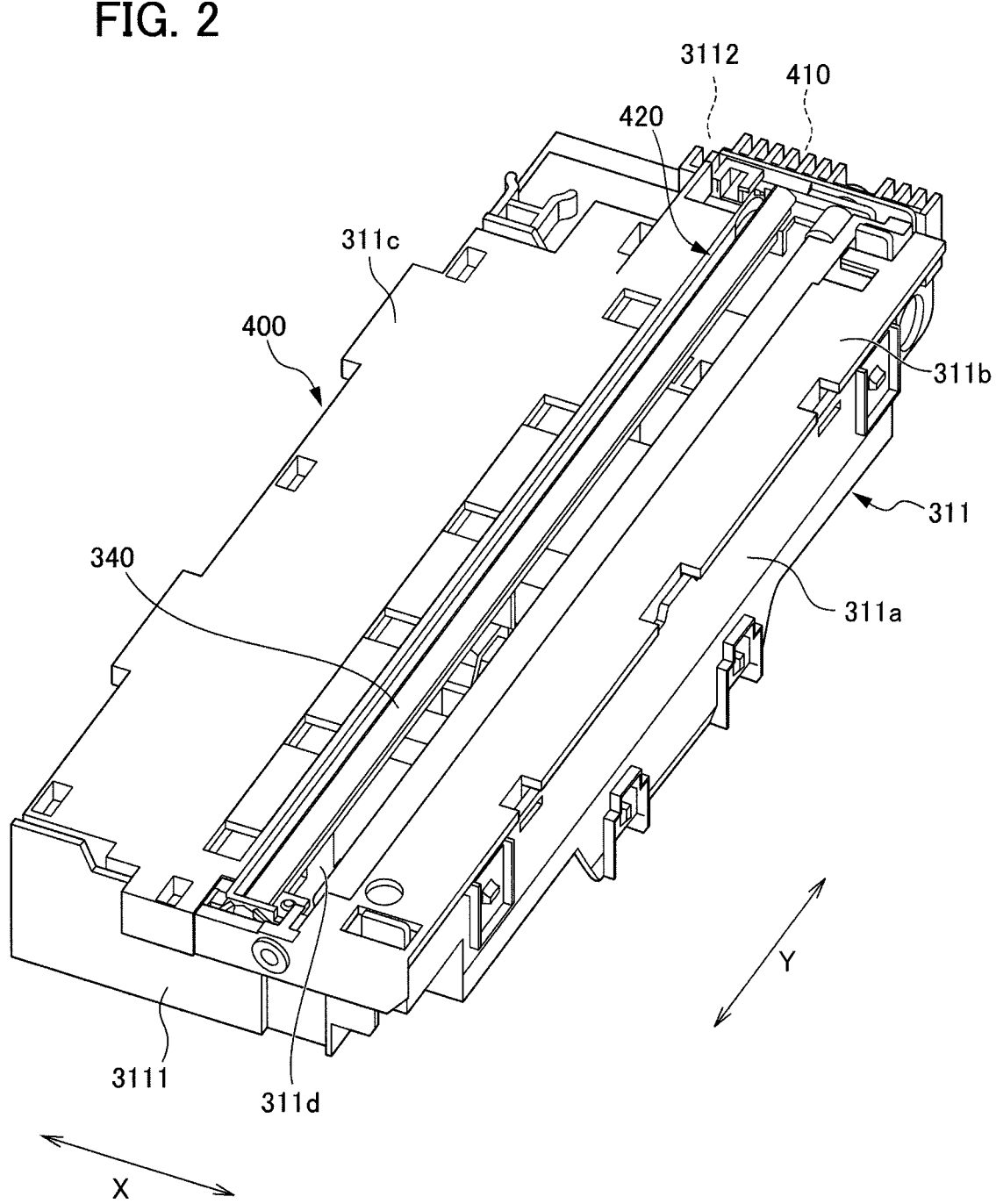
FIG. 2 is a perspective view of a light emitting unit 400 that is incorporated into an image reading device 300.
Figure 3:
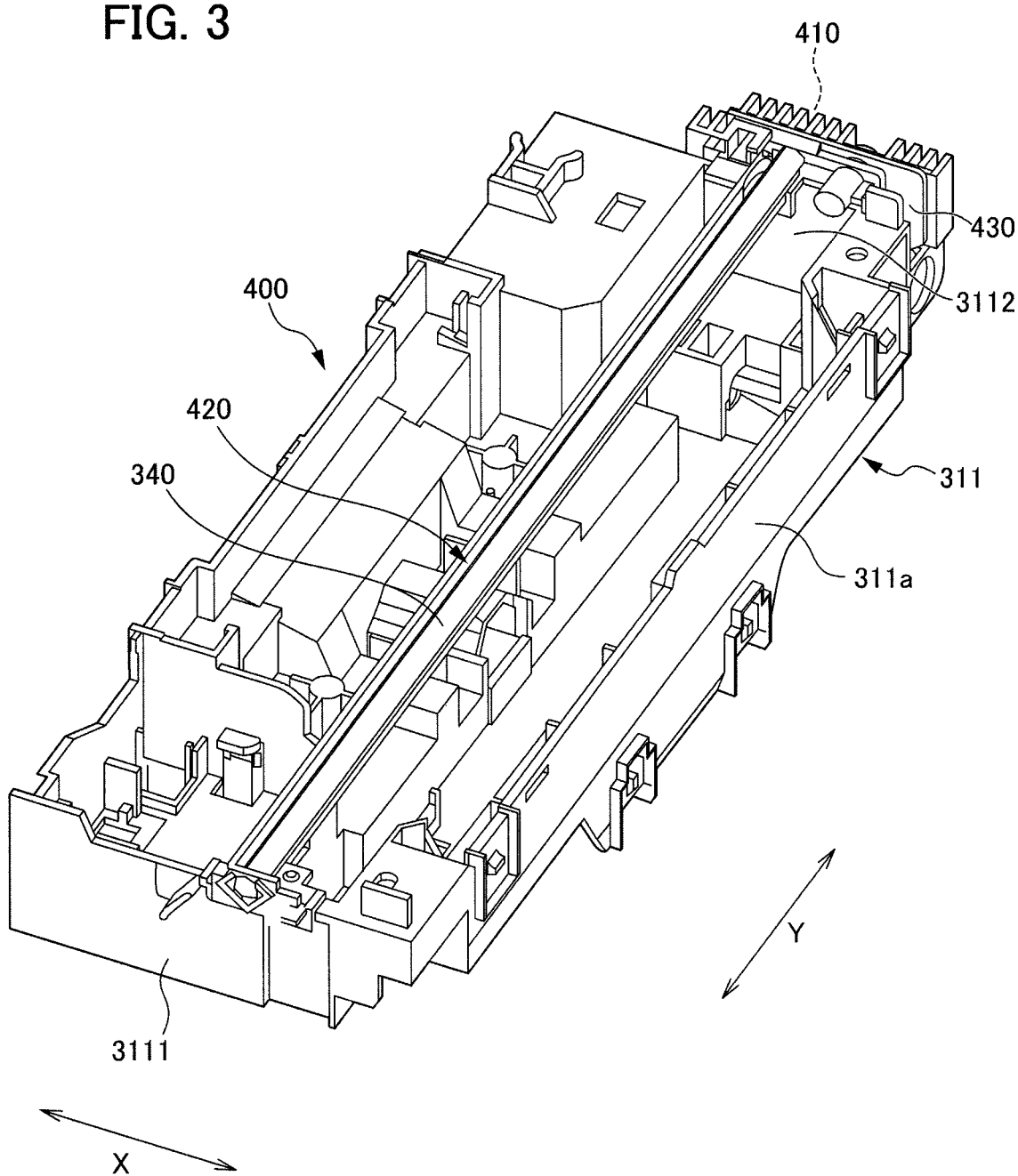
FIG. 3 is a perspective view of the light emitting unit 400, in which a cover member 311b and a cover member 311c are removed from the state shown in FIG. 2.
Figure 4:
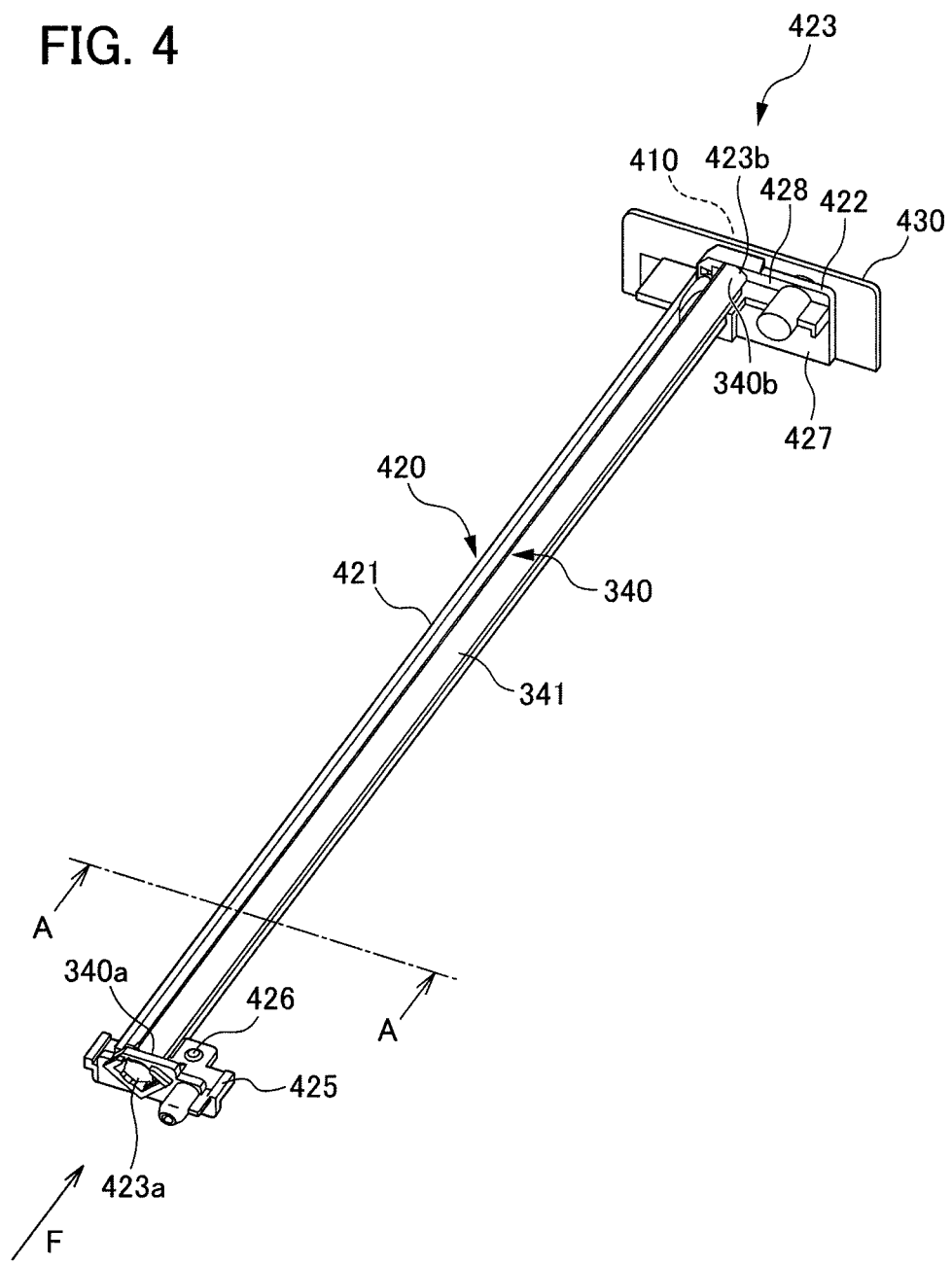
FIG. 4 is a perspective view of a holding member 420 in a state where a light guiding member 340 and an LED substrate 430 are held thereon.
Figure 5:
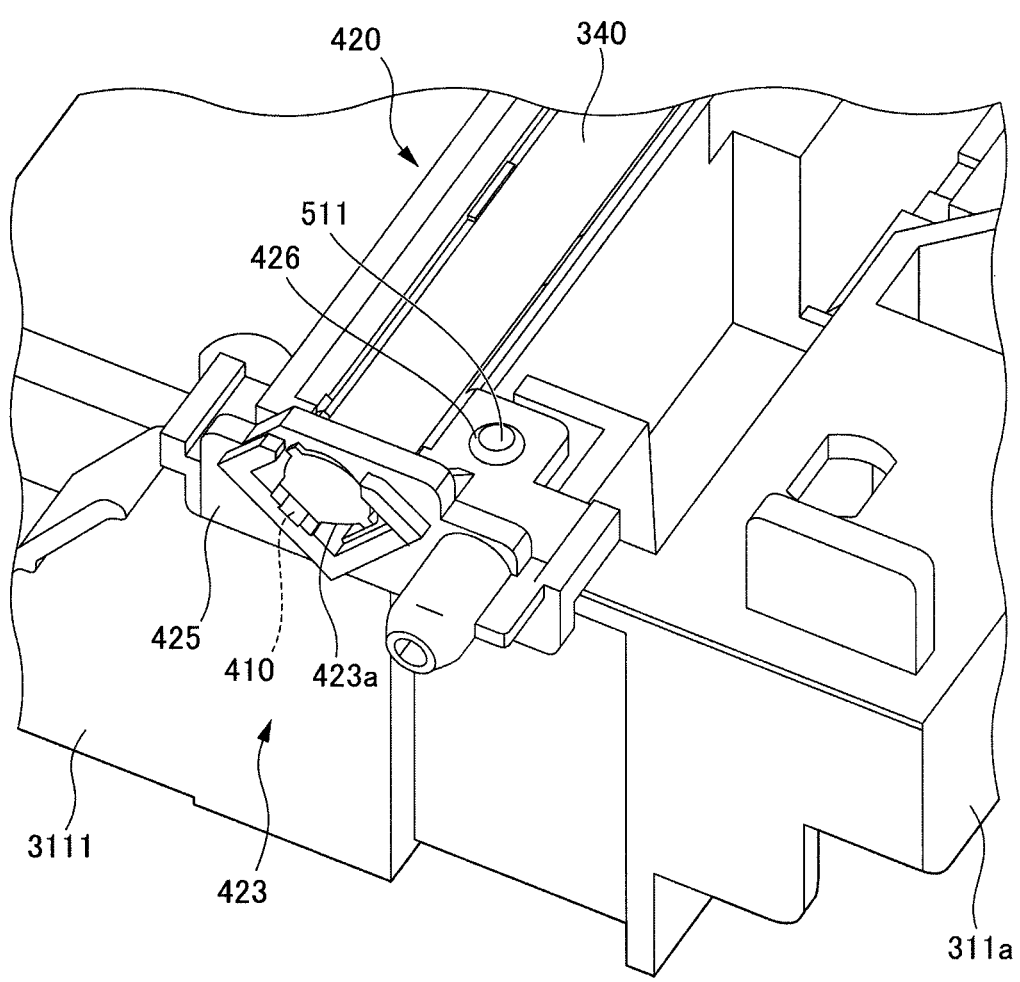
FIG. 5 is a perspective view showing a positioning structure for a base end member 425 of the holding member 420 and an outer wall portion 3111 of a first frame body 311.
Figure 6:
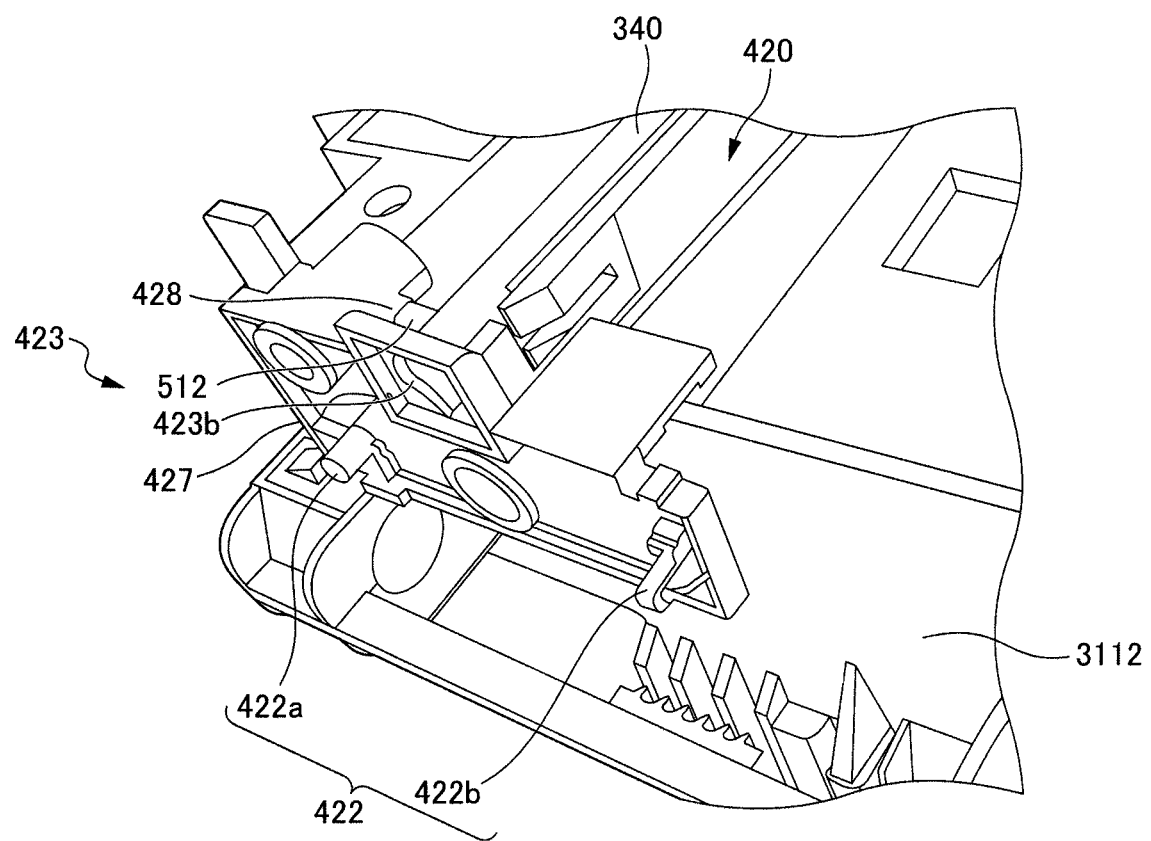
FIG. 6 is a perspective view showing a positioning structure for a tip end member 427 of the holding member 420 and an outer wall portion 3112 of the first frame body 311.
Figure 7:
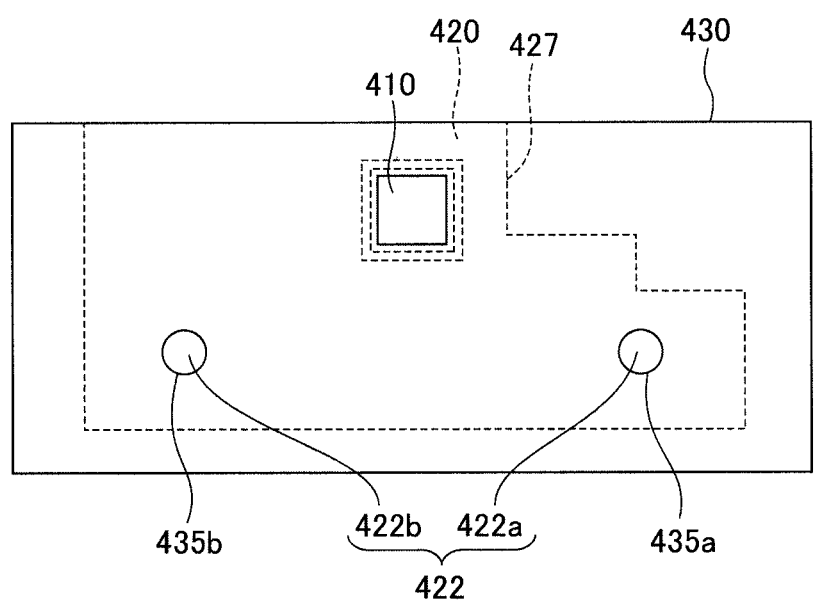
FIG. 7 is a diagram for illustrating a positioning structure for the tip end member 427 of the holding member 420 and the LED substrate 430.
Figure 8:
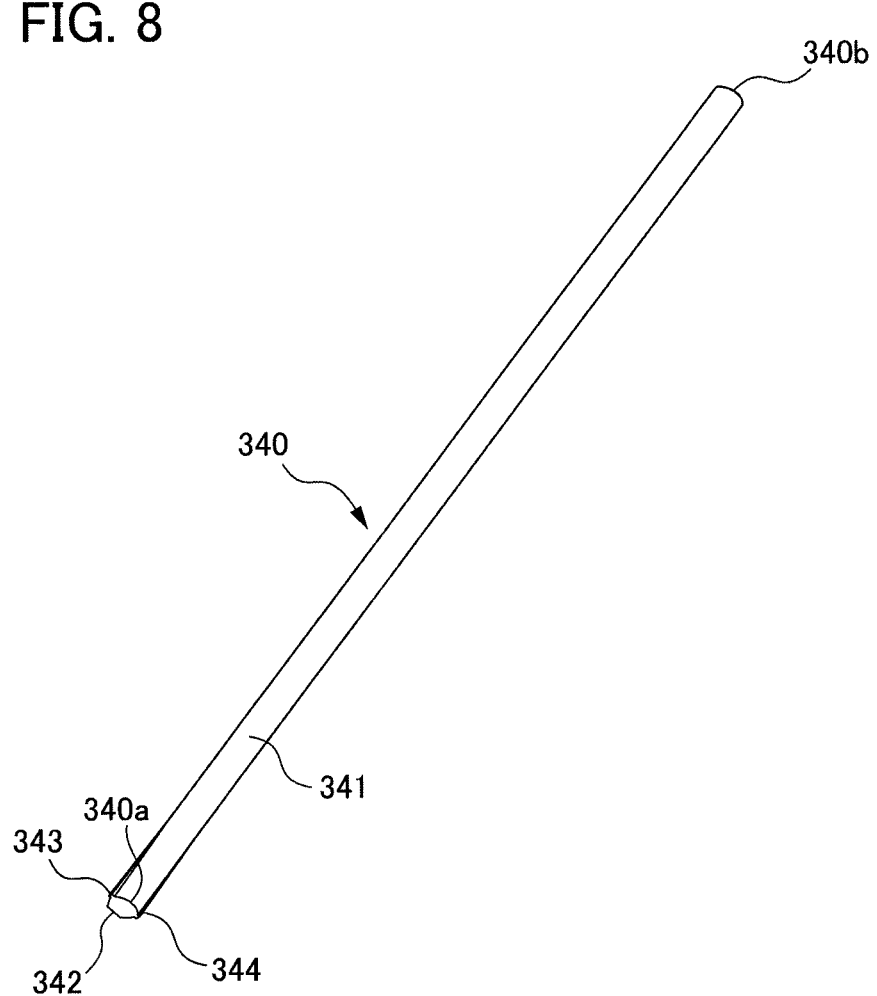
FIG. 8 is a perspective view of the light guiding member 340.
Figure 9:
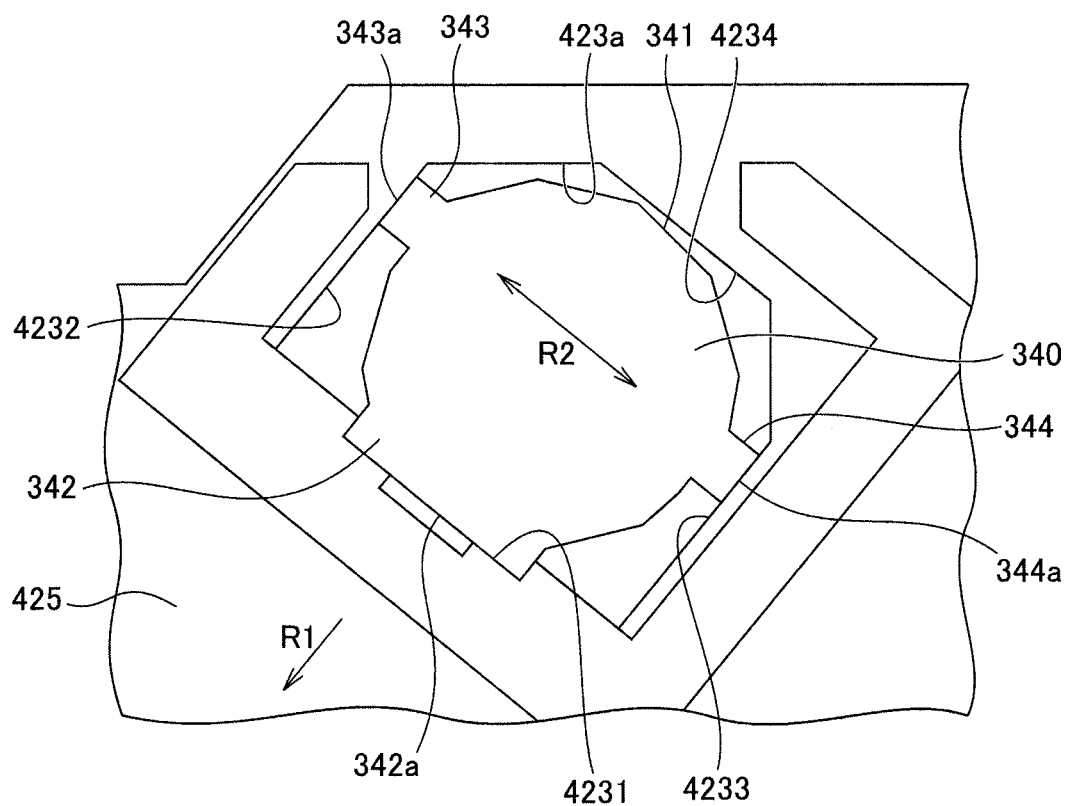
FIG. 9 is a diagram for illustrating a positioning structure for a base end hole portion 423a that is formed in a base end member 425 of the holding member 420, and for a base end portion of the light guiding member 340.
Figure 10:
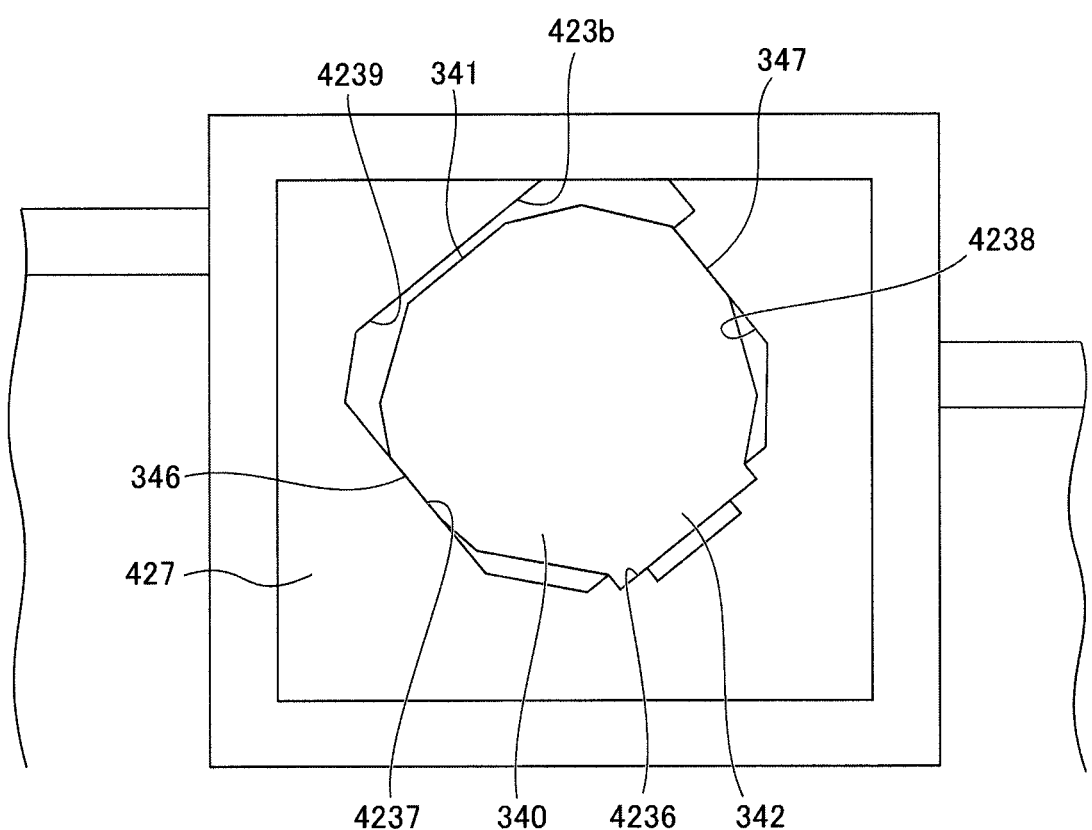
FIG. 10 is a diagram for illustrating a positioning structure for a tip end hole portion 423b that is formed in the tip end member 427 of the holding member 420, and for a tip end portion of the light guiding member 340.
Figure 11:
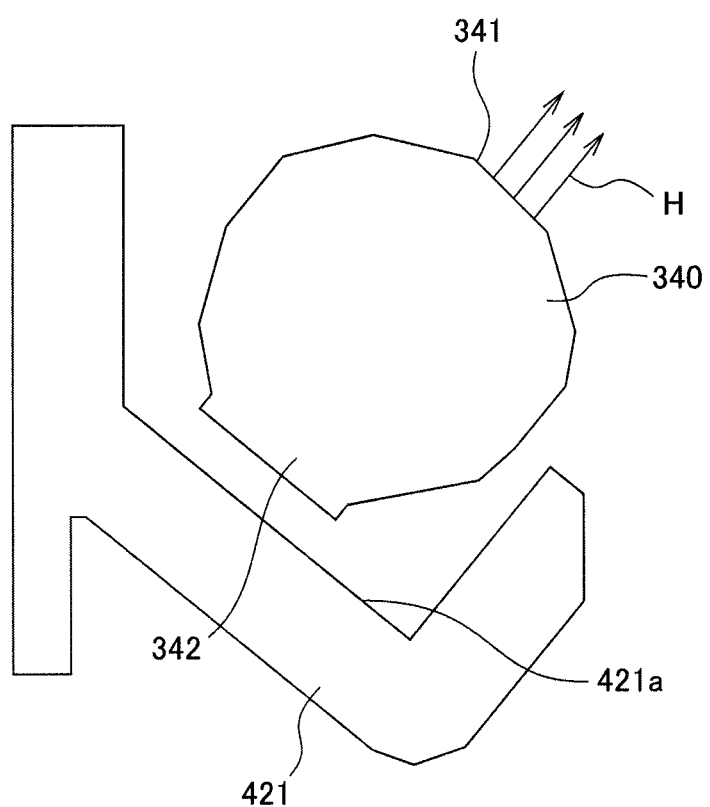
FIG. 11 is a cross-sectional view of a line A-A in FIG. 4.

FIG. 2 is a perspective view of the light emitting unit 400 that is incorporated into the image reading device 300. FIG. 3 is a perspective view of the light emitting unit 400, in which a cover member 311b and a cover member 311c are removed from the state shown in FIG. 2. FIG. 4 is a perspective view of a holding member 420 in a state where the light guiding member 340 and an LED substrate 430 are held thereon. FIG. 5 is a perspective view showing a positioning structure for a base end member 425 of the holding member 420 and an outer wall portion 3111 of a first frame body 311. FIG. 6 is a perspective view showing a positioning structure for a tip end member 427 of the holding member 420 and an outer wall portion 3112 of the first frame body 311. FIG. 7 is a diagram for illustrating a positioning structure for the tip end member 427 of the holding member 420 and the LED substrate 430. FIG. 8 is a perspective view of the light guiding member 340. FIG. 9 is a diagram for illustrating a positioning structure for a base end hole portion 423a that is formed in a base end member 425 of the holding member 420, and for a base end portion of the light guiding member 340. FIG. 10 is a diagram for illustrating a positioning structure for a tip end hole portion 423b that is formed in the tip end member 427 of the holding member 420, and for a tip end portion of the light guiding member 340. FIG. 11 is a cross-sectional view of a line A-A in FIG. 4.

The light emitting unit 400 includes: an LED 410 as a light emitting portion (see FIGS. 6 and 7); the light guiding member 340; the holding member 420; and the first frame body 311 as a case member for housing the holding member 420 in a state of being positioned in a predetermined position.

As shown in FIGS. 2 and 3, the first frame body 311 includes: a body frame 311a with a substantially box-like shape having an open top portion; and the two cover members 311b and 311c that cover the open top portion of the body frame 311a.

As shown in FIG. 2, the cover member 311b and the cover member 311c are attached to the top portion of the body frame 311a so as to be separated in a sub scanning direction X, such that an opening 311d that extends along a main scanning direction Y is formed in a top face of the first frame body 311.

The opening 311d is an opening that exposes the light guiding member 340 fixed to the body frame 311a via the holding member 420. The opening 311d is an opening for not shielding the light emitted from the light guiding member 340, but for irradiating the first reader surface 302A or the second reader surface 302B with the light.

As shown in FIG. 3, the body frame 311a has outer wall portions 3111 and 3112 that are disposed on both outer sides so as to face each other in the main scanning direction Y.

The holding member 420 is placed and held in a state of being positioned on the top face of the outer wall portion 3111 and the outer wall portion 3112.

Here, the outer wall portion 3111 is a portion corresponding to a base end side of the holding member 420. Moreover, the outer wall portion 3112 is a portion corresponding to a tip end side of the holding member 420.

More specifically, as shown in FIG. 5, a positioning pin 511 is provided on the outer wall portion 3111, and is engaged with the base end side of the holding member 420.

The base end side of the holding member 420 is placed on the outer wall portion 3111, and the positioning pin 511 is fitted into a positioning hole 426 that is formed in the base end member 425 that is disposed on the base end side of the holding member 420. As a result, the base end side of the holding member 420 is positioned in (engaged with) a predetermined position on the outer wall portion 3111 of the body frame 311a.

Moreover, as shown in FIG. 6, a positioning protrusion 512 is provided on the outer wall portion 3112, and is engaged with the tip end side of the holding member 420.

The tip end side of the holding member 420 is placed on the outer wall portion 3112, and the positioning protrusion 512 is fitted into a notch portion 428 that is formed in the tip end member 427 that is disposed on the tip end side of the holding member 420. As a result, the tip end side of the holding member 420 is positioned in a predetermined position of the outer wall portion 3112 of the body frame 311a.

The tip end side of the holding member 420 is positioned in (engaged with) the predetermined position of the outer wall portion 3112 of the body frame 311a.

As described above, the holding member 420 is attached in a state of being positioned to the body frame 311a.

Here, as shown in FIG. 4, the light guiding member 340 and the LED substrate 430 (LED 410) are positioned to the holding member 420 with a predetermined positional relationship. In addition, as a result of the holding member 420 being positioned and held to the body frame 311a, the light guiding member 340 and the LED 410, which are positioned to the holding member 420, are positioned in predetermined positions.

Next, descriptions are provided in detail for the LED 410, the LED substrate 430, the light guiding member 340 and the holding member 420.

The LED 410 is an LED (Light Emitting Diode) that functions as the light emitting portion. In the present embodiment, the LED 410 is singular.

The LED 410 is disposed on a tip end 340b side of the light guiding member 340. More specifically, the LED 410 is disposed such that a light emitting face thereof faces an end face of the tip end 340b of the light guiding member 340. The LED 410 emits light toward the end face of the tip end 340b.

As shown in FIG. 7, the LED 410 is mounted on the LED substrate 430.

The LED substrate 430 is positioned and held in a predetermined position (a predetermined orientation) of the holding member 420 by way of a first holding portion 422 that is formed on an end side of the holding member 420.

As shown in FIGS. 6 and 7, the first holding portion 422 has a pair of positioning protrusions 422a and 422b. The positioning protrusions 422a and 422b are provided in a protruding manner on an outer surface of the tip end member 427 that is shaped like a plate.

The positioning protrusions 422a and 422b are protrusions that are inserted into positioning holes 435a and 435b of the LED substrate 430. The positioning protrusions 422a and 422b are fitted into the positioning holes 435a and 435b of the LED substrate 430, thereby positioning the LED 410 mounted on the LED substrate 430 such that the light emitting face thereof faces the end face on the tip end 340b side of the light guiding member 340 in the main scanning direction Y.

The positioning protrusions 422a and 422b (the first holding portion 422) indirectly position and hold the LED 410 via the LED substrate 430.

As shown in FIG. 2, the light guiding member 340 is a stick-like light guiding member that is disposed along the main scanning direction Y. As shown in FIGS. 9 to 11, a cross-sectional shape of the light guiding member 340 is shaped as being substantially polygonal. The light guiding member 340 is a light guiding member that is composed of acrylic resin or the like.

Both ends of the light guiding member 340 are positioned and held by the holding member 420.

More specifically, the tip end 340b is positioned and held to a second holding portion 423 (the tip end hole portion 423b) that is formed in the holding member 420, and the base end 340a is positioned and held to the second holding portion 423 (the base end hole portion 423a), and as a result, the light guiding member 340 is positioned and held to the holding member 420.

An end face on the tip end 340b side of the light guiding member 340 is disposed to face the light emitting face of the LED 410.

The light guiding member 340 guides light, which is emitted from the LED 410 disposed on the tip end 340b side, in a longitudinal direction (the main scanning direction) of the light guiding member 340, and guides the light to a light irradiating portion 341 (to be described later).

The light guiding member 340 has the light irradiating portion 341 that is formed in a part of the outer periphery along the main scanning direction Y. The light irradiating portion 341 is a portion for emitting internally-guided light to the outside.

The light irradiating portion 341 is disposed in a predetermined direction, such that the first reader surface 302A or the second reader surface 302B can be irradiated with light, in a state where the light guiding member 340 is held to the first frame body 311 via the holding member 420.

Moreover, as shown in FIG. 8, the light guiding member 340 has convex portions 342, 343 and 344 that are formed on the outer circumference so as to extend along the longitudinal direction (the main scanning direction Y). The purpose of the convex portions 342, 343 and 344 is to prevent the light guiding member 340 from being attached in a wrong orientation when the light guiding member 340 is held to the holding member 420.

As shown in FIG. 9, the convex portion 342 is formed on the outer periphery on a side substantially opposite to (in a position facing) the light irradiating portion 341.

As shown in FIGS. 10 and 11, the convex portion 342 is formed on the light guiding member 340 over the entire area thereof in the longitudinal direction. A tip face 342a of the convex portion 342 is a flat face that is orthogonal to a protruding direction (a direction indicated by an arrow R1 in FIG. 9) of the convex portion 342.

The convex portion 343 and the convex portion 344 are formed on the outer periphery between the light irradiating portion 341 and the convex portion 342. The convex portion 343 and the convex portion 344 are formed in positions facing each other. As shown in FIG. 9, a protruding direction of the convex portion 343 and the convex portion 344 is a direction (a direction indicated by an arrow R2) that is orthogonal to the protruding direction (the direction indicated by the arrow R1) of the convex portion 342.

As shown in FIG. 8, the convex portions 343 and 344 are formed on the base end 340a side of the light guiding member 340.

More specifically, the convex portions 343 and 344 are formed only in a predetermined range of length from the base end 340a, and are not formed on the tip end 340b side.

In addition, as shown in FIG. 8, each of the convex portions 343 and 344 has a tapered ridge structure, in which a protruding length in a radial direction of the light guiding member 340 gradually decreases as a distance from the base end 340a increases. Moreover, a tip face 343a of the convex portion 343 and a tip face 344a of the convex portion 344 are flat faces that are orthogonal to the protruding direction (the direction indicated by the arrow R2) shown in FIG. 9.

As shown in FIG. 4, the holding member 420 has a light reflecting portion 421, the first holding portion 422 and the second holding portion 423. The holding member 420 is a member that positions and holds the LED 410 and the light guiding member 340 in predetermined positions and orientations.

As shown in FIGS. 4 and 11, the light reflecting portion 421 is a member that is disposed to face the outer periphery that is opposite to the light irradiating portion 341 side of the light guiding member 340. As shown in FIG. 4, the light reflecting portion 421 is disposed to face the light guiding member 340 over the entire area thereof in the longitudinal direction (the main scanning direction Y).

As shown in FIG. 11, the light reflecting portion 421 has an inner face 421a that faces the outer circumference of the light guiding member 340. The inner face 421a is a reflecting surface that reflects light. When light is emitted from the outer periphery of the light guiding member 340 toward the inner face 421a (light is leaked from the light guiding member 340), the inner face 421a reflects the light toward the light guiding member 340. When light is leaked from the light guiding member 340, the inner face 421a reflects the light in the same direction as a direction of the light outgoing from the light irradiating portion 341, thereby improving the irradiation efficiency of the light guiding member 340.

As shown in FIGS. 6 and 7, the first holding portion 422 has the pair of positioning protrusions 422a and 422b formed on the tip end member 427.

The positioning protrusions 422a and 422b are inserted into the positioning holes 435a and 435b of the LED substrate 430, thereby positioning and holding the LED substrate 430.

The positioning protrusions 422a and 422b (the first holding portion 422) position and hold the LED 410 via the LED substrate 430, in a state where the LED 410 mounted on the LED substrate 430 faces the end face on the tip end 340b side of the light guiding member 340.

The second holding portion 423 is configured to include the base end hole portion 423a and the tip end hole portion 423b.

The base end hole portion 423a fits onto the base end 340a side of the light guiding member 340, and the tip end hole portion 423b fits onto the tip end 340b side of the light guiding member 340; in this way, the second holding portion 423 positions and holds the light guiding member 340.

As shown in FIG. 4, the base end hole portion 423a is a substantially hexagonal through-hole that is formed in the base end member 425 of the holding member 420.

As shown in FIG. 9, the base end hole portion 423a includes: a guiding groove 4231 into which is slidably fitted by the convex portion 342 of the light guiding member 340 in the main scanning direction Y; a first flat edge 4232 that is slidably in surface contact with the tip face 343a of the convex portion 343 in the main scanning direction Y; a second flat edge 4233 that is slidably in surface contact with the tip face 344a of the convex portion 344 in the main scanning direction Y; and a contactless edge 4234 that faces the guiding groove 4231 in the inner circumference edge, and is not in contact with the outer periphery of the light guiding member 340.

The base end hole portion 423a positions the base end 340a of the light guiding member 340, in a state where rotation thereof and movement thereof in the main scanning direction Y are restricted by: fitting the convex portion 342 into the guiding groove 4231; surface contact of the first flat edge 4232 with the convex portion 342; and surface contact of the second flat edge 4233 with the convex portion 344.

Here, the guiding groove 4231 guides movement of the light guiding member 340, and achieves a function of suppressing the light guiding member 340 from being inserted in a manner different from the original manner (at a different rotation angle).

As shown in FIG. 10, the tip end hole portion 423b is a substantially tetragonal through-hole that is formed in the tip end member 427 of the holding member 420.

As shown in FIG. 10, the tip end hole portion 423b includes: a guiding groove 4236 into which is slidably fitted by the convex portion 342 of the light guiding member 340 in the main scanning direction Y; a third flat edge 4237 that is slidably in surface contact with a first outer circumferential plane 346 forming the outer circumference of light guiding member 340 in the main scanning direction Y; a fourth flat edge 4238 that is slidably in surface contact with a second outer circumferential plane 347 facing the first outer circumferential plane 346 in the main scanning direction Y; and a contactless edge 4239 that faces the guiding groove 4236, and is not in contact with the outer periphery of the light guiding member 340.

The tip end hole portion 423b positions the tip end 340b of the light guiding member 340, in a state where rotation thereof and movement thereof in the main scanning direction Y are restricted by: fitting the convex portion 342 into the guiding groove 4236; surface contact of the third flat edge 4237 with the first outer circumferential plane 346; and surface contact of the fourth flat edge 4238 with the second outer circumferential plane 347.

As described above, both ends in the main scanning direction Y of the light guiding member 340 are held to the holding member 420 by the second holding portion 423. As shown in FIG. 11, the light guiding member 340 is positioned and held to the holding member 420 in a state of being separated from the light reflecting portion 421. Only both ends of the light guiding member 340 are in contact with the holding member 420, and an intermediate portion of the light guiding member 340 is maintained in a state of being separated from the holding member 420. Accordingly, even in a case in which the light guiding member 340 is deformed due to thermal expansion or the like, contact of the light guiding member 340 with the light reflecting portion 421 is suppressed. As a result, deformation of the light reflecting portion 421 due to thermal expansion of the light guiding member 340 is suppressed.

In the present embodiment, the LED 410 is positioned and held to the holding member 420 by the first holding portion 422 via the LED substrate 430. Moreover, the light guiding member 340 is positioned and held to the holding member 420 by the second holding portion 423.

In other words, the holding member 420 positions and holds the LED 410 and the light guiding member 340.

In addition, the holding member 420 is held and positioned to the body frame 311a (the first frame body 311) by the positioning pin 511 and the positioning protrusion 512.

As a result, such a simple configuration provides the image reading device 300 (the light emitting unit 400), in which the LED 410 and the light guiding member 340 are positioned with high accuracy.

Next, descriptions are provided for assembly procedures of the light emitting unit 400.

Firstly, as shown in FIG. 4, with the tip end 340b on the front side, an operator inserts the light guiding member 340 into the base end hole portion 423a of the holding member 420. More specifically, the operator inserts the tip end 340b into the base end hole portion 423a such that the convex portion 342 is fitted into the guiding groove 4231. As a result, the image reading device 300 (the light emitting unit 400) improves the workability in assembly.

Subsequently, the operator further inserts the light guiding member 340 in a direction of an arrow F. In addition, the operator fits the tip end 340b of the light guiding member 340 into the tip end hole portion 423b, and fits the base end 340a into the base end hole portion 423a.

As a result, the light guiding member 340 is positioned and held to the holding member 420, in a state where the positional relationship with the light reflecting portion 421 and the orientation of the light irradiating portion 341 have been adjusted.

Subsequently, the operator attaches the LED substrate 430 to the holding member 420. More specifically, the operator attaches the LED substrate 430 to the holding member 420 by fitting the positioning holes 435a and 435b formed in the LED substrate 430 on the positioning protrusions 422a and 422b (the first holding portion 422) formed on the holding member 420.

As a result, the LED 410 is positioned and held via the LED substrate 430, in a state where the light emitting face faces the end face on the tip end 340b side of the light guiding member 340.

Subsequently, the operator attaches the holding member 420, which positions and holds the LED 410 and the light guiding member 340, to the body frame 311a (the first frame body 311).

More specifically, as shown in FIG. 3, the operator places the holding member 420 on the outer wall portions 3111 and 3112 of the body frame 311a of the first frame body 311.

As shown in FIG. 4, the operator fits the positioning hole 426, which is formed on the base end 340a side of the holding member 420, on the positioning pin 511 of the outer wall portions 3111, and fits the notch portion 428, which is formed on the tip end 340b side, on the positioning protrusion 512.

As a result, the holding member 420 is positioned and held to the body frame 311a (the first frame body 311) with high accuracy and stability.

Subsequently, as shown in FIG. 2, the operator disposes the two cover members 311b and 311c so as to cover the upper opening of the body frame 311a.

In this way, the light emitting unit 400 in the present embodiment is assembled.

It should be noted that, in the light emitting unit according to the present disclosure, the structure in which the case member positions the holding member is not limited to the structure described in the aforementioned embodiment. For example, in the aforementioned embodiment, the first frame body 311 as the case member has the outer wall portions 3111 and 3112 that extend in the vertical direction, and the holding member 420 is positioned by engaging the positioning pin 511 and the positioning protrusion 512 formed on the outer wall portion 3111 and 3112 with the positioning hole 426 and the positioning notch portion 428 at the both ends of the holding member 420; however, instead of such an engagement structure of the pin and protrusion, a structure such as a plurality of abutting faces may achieve such positioning.

Moreover, the structure for positioning the holding member to the case member may be a fastening structure utilizing screw-fixing.

Furthermore, the holding of the light guiding member by the holding member may be achieved by a structure that holds only one end instead of both ends described in the aforementioned embodiment.

Moreover, although the LED 410 is attached to the holding member 420 via the LED substrate 430 in the present embodiment, such attachment is not limited thereto, and the LED 410 may be directly attached to the holding member 420.

In addition, the image forming apparatus of the present disclosure is not particularly limited, and can be a copy machine, a printer, a facsimile machine, or a multi-functional printer having functions thereof.

The sheet-shaped transferred material is not limited to paper, and may be a film sheet, for example.

The invention claimed is:

1. An image reading device, comprising:
a light emitting unit, including:
a light emitting portion;
a light guiding member, an end portion of which faces the light emitting portion, and which is a stick-like light guiding member that is disposed along a main scanning direction, the light guiding member having a light irradiating portion, which is formed in a part of an outer periphery along a main scanning direction, and which emits light to an outside;
a holding member that holds the light emitting portion and the light guiding member, the holding member having a light reflecting portion that is disposed to face an outer periphery that is opposite to the light irradiating portion side of the light guiding member, a first holding portion that directly or indirectly positions and holds the light emitting portion, and a second holding portion that positions and holds one end or both ends of the light guiding member; and a case member that houses the holding member that is in a state of being positioned.

2. The image reading device according to claim 1, wherein
the case member includes an outer wall portion that extends in a perpendicular direction, and
the holding member is positioned by abutting or being engaged with the outer wall portion.

3. The image reading device according to claim 1, wherein
both ends in the main scanning direction of the light guiding member are held by the second holding portion, and
the light guiding member is positioned and held to the holding member in a state of being separated from the light reflecting portion.

4. The image reading device according to claim 3, wherein
the second holding portion is a hole portion formed in the holding member, and
the light guiding member is positioned and held by being engaged with the hole portion.

5. The image reading device according to claim 1, further comprising:
a substrate on which the light emitting portion is mounted, wherein
the light emitting portion is positioned and held to the holding member by way of the substrate being attached to the holding member.

6. An image forming apparatus, comprising:
an image reading device, including;
a light emitting portion;
a light guiding member, an end portion of which faces the light emitting portion, and which is a stick-like light guiding member that is disposed along a main scanning direction, the light guiding member having a light irradiating portion, which is formed in a part of an outer periphery along a main scanning direction, and which emits light to an outside;
a holding member that holds the light emitting portion and the light guiding member, the holding member having a light reflecting portion that is disposed to face an outer periphery that is opposite to the light irradiating portion side of the light guiding member,
a first holding portion that directly or indirectly positions and holds the light emitting portion, and
a second holding portion that positions and holds one end or both ends of the light guiding member; and
a case member that houses the holding member that is in a state of being positioned.

7. The image forming apparatus according to claim 6, wherein
the case member includes an outer wall portion that extends in a perpendicular direction, and
the holding member is positioned by abutting or being engaged with the outer wall portion.

8. The image forming apparatus according to claim 6, wherein
both ends in the main scanning direction of the light guiding member are held by the second holding portion, and
the light guiding member is positioned and held to the holding member in a state of being separated from the light reflecting portion.

9. The image forming apparatus according to claim 8, wherein
the second holding portion is a hole portion formed in the holding member, and
the light guiding member is positioned and held by being engaged with the hole portion.

10. The image forming apparatus according to claim 6, further comprising:
a substrate on which the light emitting portion is mounted, wherein
the light emitting portion is positioned and held to the holding member by way of the substrate being attached to the holding member.

11. A light emitting unit for an image reading device, the light emitting unit comprising:
a light emitting portion;
a light guiding member, an end portion of which faces the light emitting portion, and which is a stick-like light guiding member that is disposed along a main scanning direction, the light guiding member having a light irradiating portion, which is formed in a part of an outer periphery along a main scanning direction, and which emits light to an outside;
a holding member that holds the light emitting portion and the light guiding member, the holding member including
a light reflecting portion that is disposed to face an outer periphery that is opposite to the light irradiating portion side of the light guiding member,
a first holding portion that directly or indirectly positions and holds the light emitting portion, and
a second holding portion that positions and holds one end or both ends of the light guiding member; and
a case member that houses the holding member that is in a state of being positioned.

12. The light emitting unit for an image reading device according to claim 11, wherein
the case member includes an outer wall portion that extends in a perpendicular direction, and
the holding member is positioned by abutting or being engaged with the outer wall portion.

13. The light emitting unit for an image reading device according to claim 11, wherein
both ends in the main scanning direction of the light guiding member are held by the second holding portion, and
the light guiding member is positioned and held to the holding member in a state of being separated from the light reflecting portion.

14. The light emitting unit for an image reading device according to claim 13, wherein
the second holding portion is a hole portion formed in the holding member, and
the light guiding member is positioned and held by being engaged with the hole portion.

15. The light emitting unit for an image reading device according to claim 11, further comprising:
a substrate on which the light emitting portion is mounted, wherein
the light emitting portion is positioned and held to the holding member by way of the substrate being attached to the holding member.

* * * * *